June 19, 1962 W. A. FOOS 3,040,268
VARIABLE BANDWIDTH INTERMEDIATE FREQUENCY AMPLIFIER SYSTEM
Filed Dec. 23, 1959 2 Sheets-Sheet 1

INVENTOR.
WILLIAM A. FOOS
BY Gust & Irish
ATTORNEYS

VARIABLE BANDWIDTH INTERMEDIATE FREQUENCY AMPLIFIER SYSTEM

Filed Dec. 23, 1959 2 Sheets-Sheet 2

INVENTOR.
WILLIAM A. FOOS
BY Gust & Irish
ATTORNEYS

United States Patent Office 3,040,268

Patented June 19, 1962

3,040,268
VARIABLE BANDWIDTH INTERMEDIATE FREQUENCY AMPLIFIER SYSTEM

William A. Foos, Fort Wayne, Ind., assignor to International Telephone and Telegraph Corporation Filed Dec. 23, 1959, Ser. No. 861,679
2 Claims. (Cl. 330—126)

This invention relates generally to intermediate frequency amplifier systems and more particularly to a variable bandwidth intermediate frequency amplifier and detector system having a selectively variable, relatively wide bandwidth with substantiallly flat response and sharp cut-off with infinite attenuation at the band edges.

It is frequently desirable to provide an intermediate frequency amplifier and detector system which will pass a selectively variable relatively wide bandwidth, for example from three to eight megacycles with essentially flat response, for example ± .5 db and having a sharp cut-off with infinite attenuation at the band edges. To the best of the present applicant's knowledge, no prior intermediate frequency amplifier and detector system providing the requisite bandwidth and flatness of response also provided the requisite cut-off at the band edges.

It is therefore an object of the present invention to provide an improved wide bandpass sharp cut-off amplifier system.

Another object of this invention is to provide an improved variable bandwidth intermediate frequency amplifier and detector system having essentially flat response and sharp cut-off with infinite attenuation at the band edges.

In accordance with the broader aspects of my invention, I provide first tuned circuit means peaked at a frequency intermediate the high and low frequency extremities of a predetermined frequency band to be passed. Second and third tuned circuit means are coupled to the first tuned circuit means and are respectively peaked at the high and low frequency extremities of the band. First and second frequency discriminating means are coupled respectively to the second and third tuned circuit means for respectively cutting-off the frequency components above and below the high and low frequency extremities. Adding means is coupled to the discriminating means for adding the signals passed thereby.

The above-mentioned and other features and objects of this invention and the manner of attaining them will become more apparent and the invention itself will be best understood by reference to the following description of an embodiment of the invention taken in conjunction with the accompanying drawings, wherein.

Figures 2, 3, 4:
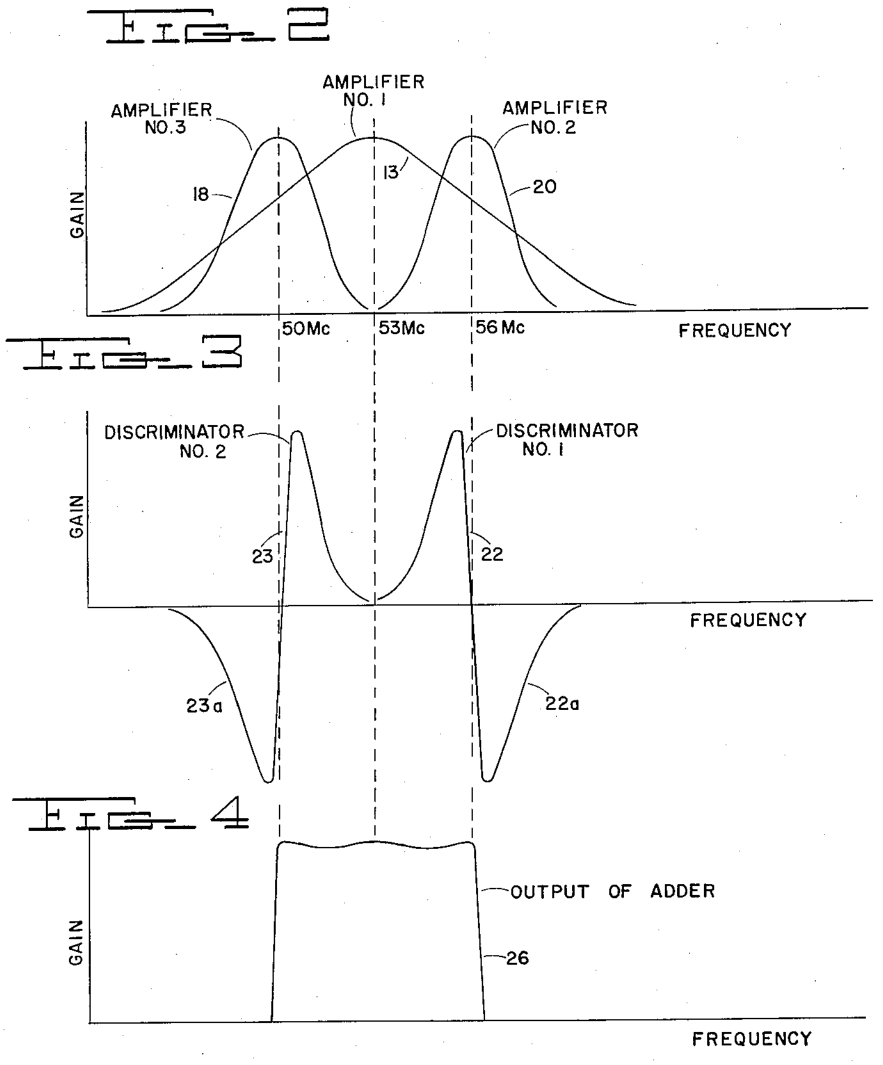
FIG. 2 is a diagram showing the frequency response of the three amplifiers of FIG. 1.
FIG. 3 is a diagram showing the frequency response of the two discriminators of FIG. 1.
FIG. 4 is a diagram showing the frequency response of the system of FIG. 1.

Referring now to FIGS. 1 through 4, inclusive, of the drawing, my improved variable bandwidth intermediate frequency amplifier and detector system, generally indicated at 10, includes a first intermediate frequency amplifier 11 having its input circuit 12 adapted to be connected to receive input signals. Intermediate frequency amplifier 11 includes a selectively tunable circuit tuned to peak at the mid or center frequency of the band to be passed. Thus, as shown in FIG. 2, assuming that the to be passed is from fifty to fifty-six megacycles, i.e., a bandwidth of six megacycles, amplifier number 1 is tuned to peak at fifty-three megacycles, thus providing a frequency response as shown by the curve 13.

A second intermediate frequency amplifier 14 is provided having its input circuit 15 coupled to the output circuit of amplifier 11. Intermediate frequency amplifier 14 includes a selectively tunable circuit tuned to peak at the high frequency edge of the band to be passed, and thus, in the specific example as shown in FIG. 2, amplifier 14 would be tuned to peak at 56 megacycles thus providing a frequency response as shown by the curve 20.

Another intermediate frequency amplifier 16 is provided having its input circuit 17 also coupled to the output circuit of amplifier 11, intermediate frequency amplifier 16 likewise including a selectively tunable circuit tuned to peak at the low frequency edge of the band to be passed. Thus, as shown in FIG. 2, in the illustrated embodiment, amplifier 16 is tuned to peak at 50 megacycles, thus providing the frequency response shown by the curve 18.

Intermediate frequency amplifiers 14 and 16 respectively have their output circuits coupled to frequency discriminators 19 and 21. Frequency discriminator 19 includes a tuned circuit tuned to the high frequency edge of the band to be passed, thus providing the characteristic shown by the curve 22 in FIG. 3. Likewise, frequency discriminator 21 includes a tuned circuit tuned to the low frequency edge of the band to be passed, thus providing a characteristic shown by the curve 23 of FIG. 3. Means are provided, preferably in the discriminators 19 and 21, as shown in FIG. 5, for respectively clipping the lower halves **22*a* and 23*a* of the discriminator characteristics 22 and 23**.

An adding circuit 24 is coupled to the output circuits of discriminators 19 and 21, thereby adding the signals passed thereby and providing in output circuit 25 a signal having a waveform as shown at 26 in FIG. 4.

Figure 1:
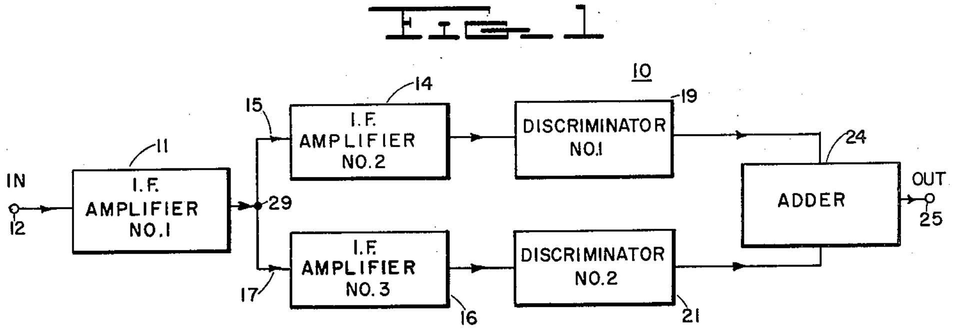
FIG. 1 is a diagram illustrating my invention in block diagram form.
Figure 5:
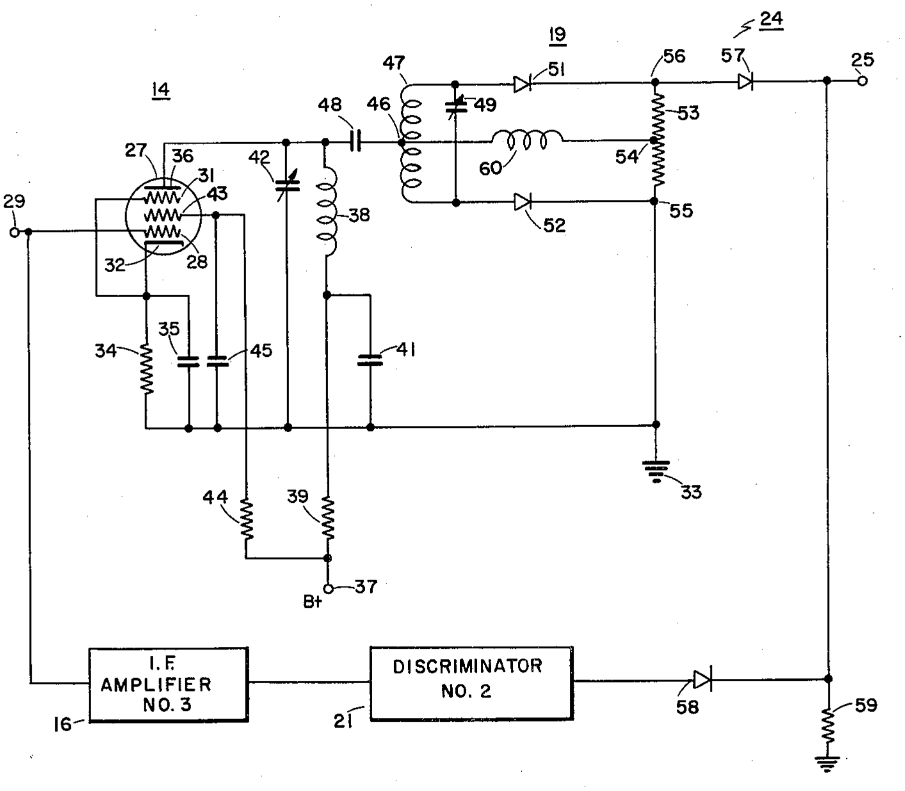
FIG. 5 is a schematic diagram of one of the intermediate frequency amplifier-discriminator channels of FIG. 1.

Referring now to FIG. 5, in which like elements are indicated by like reference numerals, there is shown the preferred circuitry for the parallel channels coupled between amplifier 11 and output terminal 25. Thus, each of the intermediate frequency amplifiers 14, 16 is shown as being a pentode amplifier, comprising a suitable pentode tube 27 having its control grid 28 connected to the input terminal 29 which in turn is connected to the output circuit of the intermediate frequency amplifier 11 of FIG. 1. Suppressor grid 31 of pentode 27 is connected to cathode 32 which in turn is connected to ground 33 by a cathode resistor 34 with a by-pass capacitor 35 connected in parallel therewith. Plate 36 of pentode 27 is connected to a suitable source 37 of positive plate potential, such as +250 volts, by inductance 38 and plate resistor 39. Capacitor 41 is connected between a point intermediate inductance 38 and resistor 39 and ground 33, and a variable capacitor 42 is connected between plate 36 of pentode 27 and ground, as shown. It is thus seen that inductance 38 and variable capacitor 42 form a tank circuit, thus providing the selectively tunable peak responses 15, 18 shown in FIG. 2. Screen grid 43 of pentode 27 is connected to the positive source of plate potential 37 by resistor 44 and to ground 33 by capacitor 45.

Plate 36 of pentode 27 is coupled to the midpoint 46 of inductance 47 by a suitable coupling capacitor 48, and variable capacitor 49 is connected across inductance 47, as shown. Clipping diodes 51 and 52 respectively connect the ends of inductance 47 to the ends of resistor 53. The midpoint 54 of resistor 53 is connected to the midpoint 46 of inductance 47 by inductance 60 and the end 55 of resistor 53 to which diode 52 is connected is also connected to ground 33 as shown. The other end 56 of resistor 53 to which the diode 51 is connected is connected to output terminal 25 by diode 57.

The other intermediate frequency amplifier, discriminator channel, which will be an essential duplicate of that shown in FIG. 5, is connected between input terminal 29 and diode 58, a resistor 59 connecting output terminal 25 to ground as shown; it will be readily recognized that diodes 57 and 58 form the adding circuit 24. It will be readily understood that the input intermediate frequency amplifier 11 may also be a pentode amplifier similar to the amplifiers 14, 16, shown in FIG. 5.

In an actual system constructed in accordance with FIG. 5, the following component values were employed:

| | |
|---|---|
| Pentode **27** | 6AH6 |
| Resistor **34** ____ohms__ | 91 |
| Capacitor **35** ____microfarads__ | 1,000 |
| Capacitor **42** ____do____ | 1–30 |
| Resistor **39** ____ohms__ | 100 |
| Capacitor **41** ____microfarads__ | 1,000 |
| Resistor **44** ____ohms__ | 20,000 |
| Capacitor **45** ____microfarads__ | 1,000 |
| Capacitor **48** ____do____ | 5 |
| Capacitor **49** ____do____ | 1–30 |
| Diodes **51**, **52** | IN127A |
| Resistor **53** ____ohms__ | 16,400 |
| Diodes **57**, **58** | IN69 |
| Resistor **59** ____ohms__ | 100,000 |

I have found that the system described above, and as shown in FIG. 5 provides a response which is flat to ±.5 db over a bandwidth variable from three to eight megacycles.

It will now be readily seen that I have provided an intermediate frequency amplifier and detector system having an essentially flat selectively variable, relatively wide bandwidth and sharp cut-off with infinite attenuation at the high and low band edges.

While I have described above the principles of my invention in connection with specific apparatus, it is to be clearly understood that this description is made only by way of example and not as a limitation to the scope of my invention.

What is claimed is:

1. A wide bandpass, sharp cut-off amplifier and detector system comprising: an input circuit for receiving an input signal and including a tuned circuit peaked at the center frequency of a predetermined frequency band to be passed thereby passing frequency components adjacent said center frequency and attenuating frequency components on either side thereof; first and second amplifiers coupled to said input circuit, said first amplifier including a tuned circuit peaked at the high frequency end of said band thereby passing frequency components adjacent said high frequency end and attenuating frequency components on either side thereof, said second amplifier including a tuned circuit peaked at the low frequency end of said band thereby passing frequency components adjacent said low frequency end and attenuating frequency components on either side thereof; first and second frequency discriminators coupled respectively to said first and second amplifiers, said discriminators respectively including clipping diodes for clipping the lower half of the discriminator characteristic, said first discriminator cutting-off frequency components above said high frequency end of said band and said second discriminator cutting-off frequency components below said low frequency end of said band; and an adding circuit coupled to said first and second discriminators for adding the signals passed thereby.

2. A variable bandpass, sharp cut-off intermediate frequency amplifier and detector system comprising: a first intermediate frequency amplifier having an input circuit for receiving an input signal and having an output circuit, said first amplifier including a selectively tunable circuit tuned to peak at the center frequency of a predetermined frequency band to be passed; a second intermediate frequency amplifier having an input circuit coupled to said first amplifier output circuit and having an output circuit, said second amplifier including a selectively tunable circuit tuned to peak at the high frequency end of said band; a first frequency discriminator having an input circuit coupled to the output circuit of said second amplifier and having an output circuit, said first frequency discriminator including a selectively tunable circuit tuned to said high frequency end of said band and clipping diodes for clipping the lower half of the discriminator characteristic whereby said first frequency discriminator passes frequency components below said high frequency end of said band and cuts-off frequency components above said high frequency end; a third intermediate frequency amplifier having an input circuit coupled to said first amplifier output circuit and having an output circuit, said third intermediate frequency amplifier including a selectively tunable circuit tuned to peak at the low frequency end of said band; a second frequency discriminator having an input circuit coupled to the output circuit of said third amplifier and having an output circuit, said second frequency discriminator including a selectively tunable circuit tuned to said low frequency end of said band and detector means and clipping diodes for clipping the lower half of the discriminator characteristic whereby said second frequency discriminator passes frequency components above said low frequency end of said band and cuts-off frequency components below said low frequency end; and an output circuit including an adding circuit coupled to the output circuits of said first and second discriminators for adding the signals passed thereby.

References Cited in the file of this patent

UNITED STATES PATENTS

| | | |
|---|---|---|
| 2,323,609 | Kihn | July 6, 1943 |
| 2,709,206 | Ferguson | May 24, 1955 |
| 2,710,315 | Tongue | June 7, 1955 |

FOREIGN PATENTS

| | | |
|---|---|---|
| 465,887 | Great Britain | May 18, 1937 |